United States Patent Office 3,431,225
Patented Mar. 4, 1969

3,431,225
MOLDING COMPOSITIONS COMPRISING ISOTACTIC POLYPROPYLENE BLEND, FILLER AND METALLIC SOAP
Norman D. Duncan, Vienna, Ohio, assignor to General Motors Corporation, Detroit, Mich., a corporation of Delaware
No Drawing. Filed Sept. 20, 1965, Ser. No. 488,725
U.S. Cl. 260—23                      4 Claims
Int. Cl. C08f 29/02, 45/04, 45/58

ABSTRACT OF THE DISCLOSURE

A molding composition which yields a molded part having an average notched izod impact strength of 2 to 3.5 ft. lbs./in., an average tensile strength of over 3500 ft. lbs./in., an average elongation at break of above 60% and an average heat deflection temperature of above 250° F. as disclosed. The composition comprises 60 to 67½% polypropylene blend having an average melt flow of from 3 to 3.4, 0.5 to 2.2% of a metallic soap and either a silica or an asbestos filler.

---

This invention relates to thermoplastic materials and is particularly concerned with polypropylene blends suitable for use as extrusion and molding compositions.

It is, therefore, an object of the invention to provide a physical mixture including polypropylene that is useful in extrusion and molding wherein the material is a filled blend of polypropylene resins having low melt flow and high melt flow characteristics so that suitable molding techniques can be followed while maintaining high impact strength in the molded material.

Another object of the invention is to provide a molding composition which may be mixed in the dry form and due to its physical characteristics, is suitable for injection molding as well as compression molding without segregation of the components thereof.

Another object of the invention is to provide a filled blend of polypropylene materials having different melt flow characteristics for extrusion or molding purposes which blends have less shrinkage, produce fewer sinks and have less warpage than conventional materials.

Further objects and advantages will be apparent from the following description.

The molding of polypropylene materials is well-known in the art. These materials being thermoplastic, may be extruded or injection molded to form articles of the desired shape. However, when specific physical characteristics are desired in the final product, the compounding techniques become more critical and it has been found that various blends and controls must be used in order to obtain satisfactory products. This invention is directed specifically to a filled polypropylene molding compound which can be either injection molded or extruded and which produces an article having relatively high impact strength. Further, the compound may be mixed in inexpensive mixing apparatus and does not require kneading type mixers such as a Banbury mixer or mills. In this manner, the compound may be dry blended by tumbling and fed directly to the extruder without danger of undesirable segregation of the several ingredients therein.

Specifically, the compound consists of a mixture of polypropylene materials having different melt flow characteristics together with fillers, stabilizers and lubricants. I prefer to use equal quantities of a low melt flow material and a high melt flow material, for example a polypropylene having a melt flow of .4 and a polypropylene having a melt flow of 6.0. Further, the polypropylene materials used should be approximately 90% isotatic with the remaining portions thereof being steroblock and atactic. In this connection, a reasonably high percentage of atactic molecules is desirable, although not entirely necessary. The polypropylene is used in the form of reactor powder or flake which can be obtained commercially without requiring added operations of grinding to alter the size thereof. Reaction powder or flakes, as commercially obtained, is a fine powder 99+% of which will pass a 60 mesh screen and affords the compounder the opportunity of using simple, dry blending techniques. Pellet forms of the polymer, while usable, requires the use of kneading type mixers in order to assure that the mixture will remain homogeneous.

The use of two melt flow range materials is important to the success of this compound since it imparts the desired strength and impact resistance to the finished article while permitting easy extrusion and molding thereof. The low melt flow material offers high impact resistance and in this connection, polypropylene molding material having a nominal melt flow of .4 has been found most desirable. In order to make this material readily extrudable and moldable I add a substantially equal amount of high melt flow resin and in this connection, resin having a nominal melt flow in the order of 6.0 is most desirable. This resin in combination with the low melt flow material imparts an intrinsic viscosity to the combination within useful ranges for processing. It is understood that melt flow may be expressed in intrinsic viscosity figures and in this instance the intrinsic viscosity of a resin having .4 nominal melt flow is 6.2 whereas the intrinsic viscosity for 6.0 melt flow resins is 2.2. It is apparent that the average melt flow of an equal mixture of the two resins will be 3.2 or stated differently, the average intrinsic viscosity of the mixture will be 4.2. Variations in the percentage of the two resins used in the mixture to obtain the desirable average flow figure is within the purview of the invention. However, I have found that when 50% to 60% by weight of the total polymer content is of a nominal 6.0 melt flow, that the cost workable molding material is obtained.

Added to this resin mixture is a filler, preferably silica dust sold under the trade name Minusil. This material will all pass through a 300 mesh screen. In place of silica, other relatively inert fillers having a relatively low coefficient of thermal expansion may be used, for example asbestos powder and the like. It is important, however, that the thermal coefficient of expansion of the filler material is low, since the increased quantities required to meet the mold shrinkage levels where materials of higher coefficients of expansion are used, reduce impact strength and elongation of the formed part in tension. I have found that silica, because of its very low thermal coefficient of expansion, will reduce shrinkage in the molded part to a greater extent and under more desirable conditions than any other filler compatible with the economics of the procedure.

In addition, a metallic soap is added as a stabilizer and lubricant. This soap is preferably calcium stearate and reduces the notched izod impact strength less than several other lubricants tried and thereby improves the characteristics of the part. In place of calcium stearate, zinc or aluminum salts of stearic, palmitic or oleic acids may be used in like quantities.

A specific formula for a molding composition made under the teachings of the present invention is:

| | Percent |
|---|---|
| Polypropylene powder (melt flow 0.4, particle size 99+% passes 60 mesh screen) | 31.86 |
| Polypropylene powder (melt flow 6.0, particle size 99+% passes 60 mesh screen) | 31.86 |
| Silica dust (99+% passes a 60 mesh screen) | 34.32 |
| Calcium stearate (99+% passes a 60 mesh screen) | 1.96 |

Variations of this formulation may occur and in this connection, as noted heretofore, the 63.72% of polypropylene may be adjusted with respect to the two components thereof so that the melt flow is in a range of from 3 to 3.4. Similarly, the total quantity of polypropylene may vary but should be within the range of 60% to 67½% by weight of the total formula. The metallic soap may vary between 0.5% to 2.2% by weight. In all instances the filler material will make up the difference.

Any of the aforementioned molding compounds when used in an extruder should be processed with a melt stream temperature within the range of 350° F. to 500° F. Injection molding techniques require that the compound be heated from 350° F. to 500° F. and then injected into a die or mold preferably maintained at a temperature below 200° F. Molded test bars made from the preferred recipe and annealed for 20 minutes at 275° F. will have the following physical and electrical properties. (Part made from formula.)

| | |
|---|---|
| Notched izod impact, ft. lbs./in. | 2.18 |
| Tensile strength, p.s.i. | 4,038 |
| Elongation after break, percent | 15 |
| Elongation at break, percent | 62 |
| Flexural modulus | $3.99 \times 10^5$ |
| Heat deflection, ° F. | 275 |
| Specific gravity | 1.164 |
| Dielectric strength, v./mil. | 1850 |

NOTE.—All values given are average.

I have found that this material, when molded or extruded, is highly desirable for use in electrical sockets, terminal housings, terminal blocks and other electrical applications, particularly for automotive applications. The material is relatively heat resistant having a heat deflection temperature of above 250° F. to 275° F. which makes it highly desirable for any commercial application under either normal or extreme operating conditions of the vehicle.

I am aware of the use of fiber glass as a filler material. This, however, is more expensive than silica dust and is more difficult to mix and to process. Further, the silica dust offers greater compatibility to the mixture which enhances its desirability in various molding techniques. The present material, in addition to being highly useful in conventional processes of extrusion, injection and compression molding may also be vacuum formed from sheet stock made by any of the usual processes whereby the molding composition offers great flexibility with respect to its range of uses and to the methods performed to produce articles for those uses.

While the embodiments of the present invention as herein disclosed, constitute preferred forms, it is to be understood that other forms might be adopted.

What is claimed is as follows:

1. A molding composition wherein a molded part made therefrom has an average notched izod impact strength of 2 to 3.5 ft. lbs./in., an average tensile strength of over 3500 ft. lbs./in., an average elongation at break of above 60% and an average heat deflection temperature of above 250° F., said molding compound being adapted for extrusion, injection or compression molding and comprising an intimate mixture of powdered materials all capable of passing a 60 mesh screen with less than 1% retention and comprising by weight 60% to 67½% of polypropylene blends having at least 90% isotatic structure and having an average melt flow of from 3 to 3.4, 0.5% to 2.2% of a metallic soap taken from the group consisting of calcium soap, zinc soap and aluminum soap, with the remainder being made up of a filler taken from the class consisting of silica and asbestos, said compound being in the form of a physical mixture of said ingredients.

2. A high impact strength molding composition wherein a molded part made therefrom has an average notched izod impact strength of 2 to 3.5 ft. lbs./in., an average tensile strength of over 3500 ft. lbs./in., an average elongation at break of above 60%, and an average heat deflection temperature of above 250° F., said molding compound being adapted for extrusion, injection or compression molding and comprising an intimate mixture of powdered materials all capable of passing a 60 mesh screen with less than 1% retention and comprising 31 to 32% by weight of polypropylene having at least 90% isotatic structure and having a melt flow of .4, 31 to 32% of polypropylene having at least 90% isotatic structure and having a melt flow of 6.0, 0.5% to 2.2% calcium stearate, with silica making up the remainder, said materials being in the form of a physical mixture of said ingredients.

3. A high impact strength molding composition wherein a molded part made therefrom has an average notched izod impact strength of about 2.18 ft. lbs./in., an average tensile strength of about 4000 ft. lbs./in., an average elongation at break of about 62% and an average heat deflection temperature of about 275° F., said molding compound comprising an intimate mixture of powdered materials all capable of passing a 60 mesh screen with less than 1% retention and comprising 31.86% by weight of 90% isotatic polypropylene having a melt flow of .4, 31.86% of 90% isotatic polypropylene having a melt flow of 6.0, 34.42% silica powder and 1.90% calcium stearate, said material being in the form of a physical mixture of said materials.

4. A high impact strength molding composition wherein a molded part made therefrom has an average notched izod impact strength of about 2 ft. lbs./in., an average tensile strength of about 4000 ft. lbs./in., an average elongation at break of about 62% and an average heat deflection temperature of about 275° F., said molding compound comprising, an intimate mixture of powdered materials all capable of passing a 60 mesh screen with less than 1% retention and comprising about 32% by weight of about 90% isotatic polypropylene having a melt flow of .4, 32% of about 90% isotatic polypropylene having a melt flow in the order of 6.0, about 34% silica powder and about 2% calcium stearate, said material being in the form of a physical mixture of said materials.

References Cited

UNITED STATES PATENTS

| | | | |
|---|---|---|---|
| 3,125,548 | 3/1964 | Anderson | 260—897 |
| 3,137,672 | 6/1964 | Lehane | 260—41 |
| 3,156,666 | 11/1964 | Pruett | 260—41 |
| 3,179,720 | 4/1965 | Hillmer | 260—897 |
| 3,254,041 | 5/1966 | Pierri | 260—23 |
| 3,335,104 | 8/1967 | Kopacki et al. | 260—23 |
| 3,354,239 | 11/1967 | Short | 260—876 |

DONALD E. CZAJA, *Primary Examiner.*

R. A. WHITE *Assistant Examiner.*

U.S. Cl. X.R.

260—41, 897